United States Patent
Takahashi et al.

(10) Patent No.: US 6,447,955 B1
(45) Date of Patent: Sep. 10, 2002

(54) LITHIUM SECONDARY BATTERY WITH A NEGATIVE ELECTRODE OF HEAT-TREATED NATURAL GRAPHITE

(75) Inventors: Masatoshi Takahashi, Sohraku-gun; Ryuji Ohshita, Neyagawa; Koji Ueno; Koji Nishio, both of Hirakata; Toshihiko Saitoh, Tsuzuki-gun, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 08/671,077

(22) Filed: Jun. 27, 1996

Related U.S. Application Data

(63) Continuation of application No. 08/411,927, filed on Mar. 28, 1995, now abandoned, which is a continuation of application No. 08/138,016, filed on Oct. 19, 1993, now abandoned.

(30) Foreign Application Priority Data

Mar. 30, 1993 (JP) .............................. 5-096875

(51) Int. Cl.⁷ ................................. H07M 4/96
(52) U.S. Cl. .................... 429/231.8; 29/623.1
(58) Field of Search ................. 429/218, 194, 429/218.2, 231.8; 29/623.1

(56) References Cited

U.S. PATENT DOCUMENTS

| | | | |
|---|---|---|---|
| 4,388,227 A | * 6/1983 | Kalnin | 423/447.1 |
| 4,423,125 A | 12/1983 | Basu | |
| 4,668,595 A | 5/1987 | Yoshino et al. | |
| 4,702,977 A | 10/1987 | Hiratsuka et al. | |
| 4,707,423 A | * 11/1987 | Kalnin et al. | 429/194 X |
| 4,725,422 A | 2/1988 | Miyabayashi et al. | |
| 4,863,818 A | * 9/1989 | Yoshimoto et al. | 429/218 |
| 4,980,250 A | 12/1990 | Takahashi et al. | |
| 5,053,297 A | * 10/1991 | Yamahira et al. | 429/194 |
| 5,153,082 A | * 10/1992 | Ogino et al. | 429/218 X |

FOREIGN PATENT DOCUMENTS

| | | | |
|---|---|---|---|
| EP | 0573266 | 12/1993 | |
| EP | 0593785 | 4/1994 | |
| JP | 356159062 A | * 12/1981 | H01M/4/20 |
| JP | 57019970 A | 2/1982 | |
| JP | 57208079 | 12/1982 | |
| JP | 63139012 A | 6/1988 | |
| JP | 04184862 A | 7/1992 | |
| JP | 05028996 A | 2/1993 | |
| JP | 405028996 A | * 2/1993 | |
| JP | 5089879 | 4/1993 | |
| JP | 06084542 A | 3/1994 | |
| JP | 06239607 A | 8/1994 | |
| JP | 406290781 A | * 10/1994 | H01M/4/58 |
| JP | 407073868 A | * 3/1995 | H01M/4/04 |
| JP | 408096797 A | * 4/1996 | H01M/4/02 |
| JP | 408096798 A | * 4/1996 | H01M/4/02 |
| JP | 408298117 A | * 11/1996 | H01M/4/58 |
| JP | 409330718 A | * 12/1997 | H01M/4/58 |

OTHER PUBLICATIONS

Smirnov et al., "Structural and Chemical Transformations of Graphite Carbon Materials in the Process of Heat Treatment", 1987.

* cited by examiner

Primary Examiner—Patrick Ryan
Assistant Examiner—Mark Ruthkosky
(74) Attorney, Agent, or Firm—Birch, Stewart, Kolasch & Birch, LLP

(57) ABSTRACT

A lithium secondary battery comprises a natural graphite as a negative electrode capable of occluding and discharging lithium ion, in which the natural graphite has been heat treated at a temperature of from 2,400–3,000° C. The heat treatment removes impurities from natural graphite. As a result, the electrolyte solution used for the battery hardly decomposes during charge and discharge and self discharge hardly occurs during storage of the battery.

10 Claims, 3 Drawing Sheets

LITHIUM SECONDARY BATTERY WITH A NEGATIVE ELECTRODE OF HEAT-TREATED NATURAL GRAPHITE

This application is a continuation, of application Ser. No. 08/411,927 filed on Mar. 28, 1995, now abandoned, which is a continuation, of application Ser. No. 08/138,016 filed on Oct. 19, 1993, now abandoned.

BACKGROUND OF THE INVENTION

1. Field of the invention

The present invention relates to a lithium secondary battery and, more specifically to improvement of negative electrode material used therefor to achieve better cycle characteristics and storage capability.

2. Description of the prior art

In recent years, lithium secondary batteries utilizing non-aqueous electrolytes have become spotlighted because of possible high-voltage design without taking decomposition voltage of water into consideration, thus differing from water-based secondary batteries utilizing aqueous electrolyte solutions, such as nickel-cadmium batteries.

Metallic lithium has been used as the negative electrode material of these lithium secondary batteries. In recent years, however, it has been pointed out that metallic lithium causes bad cycle characteristics due to growth of dendric deposits of lithium. Carbon materials, that occlude and discharge lithium ion solely during charge and discharge and have no problem of the above, are now studied as replacement of metallic lithium. Among these carbon materials, natural graphite is, having particularly high crystallinity and a large discharge capacity of 370 mAh/g, one of the most promising negative electrode materials.

However, natural graphite, being a natural product, contains in the crystals thereof impurities such as bound water and active terminal groups. These impurities react, during charge or discharge or during storage, with the electrolyte solution used to decompose and degrade it, whereby lithium secondary batteries with a negative electrode of natural graphite have had the problem of poor cycle characteristics and storage characteristics.

SUMMARY OF THE INVENTION

Accordingly, an object of the present invention is to provide a lithium secondary battery with a negative electrode of natural graphite having excellent cycle characteristics and storage characteristics.

The present invention provides a lithium secondary battery (hereinafter referred to as "the battery of the present invention") comprising a natural graphite as a negative electrode capable of occluding and discharging lithium ion, said natural graphite having been heat treated at a temperature of at least 1800° C.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
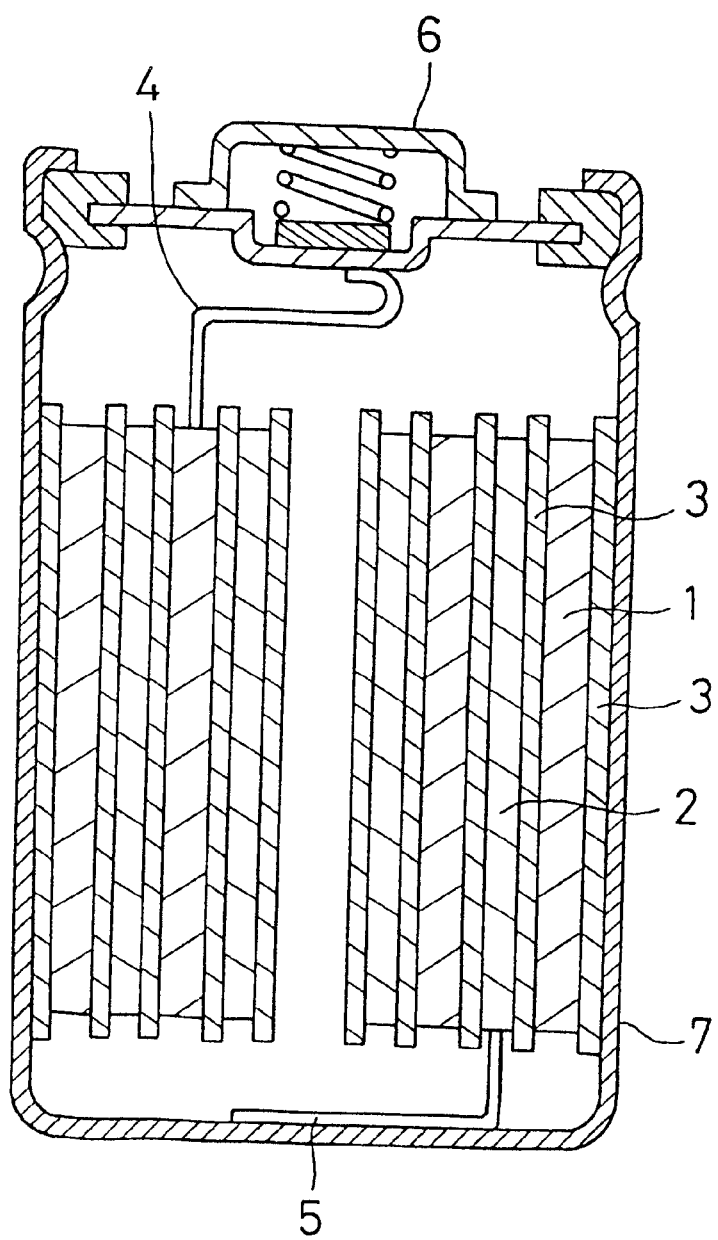
FIG. 1 is a schematic cross-sectional view of the battery of the present invention.

This application claims the priority of Japanese Patent Application No. 5-96875 filed Mar. 30, 1993, which is incorporated herein by reference.

In the battery of the present invention, utilizing natural graphite from which impurities have been removed by heat treatment at a high temperature of at least 1,800° C., the electrolyte solution used hardly decomposes even by repeated cycles of charge and discharge. Besides, self discharge caused by impurities during storage is minimized. These facts constitutes the grounds for the battery of the present invention having better cycle characteristics and storage characteristics as compared with lithium secondary batteries utilizing natural graphite as it is, without heat treatment.

The above heat treatment is carried out by heating natural graphite in a heating oven at a temperature of at least 1,800° C. under an atmosphere of inert gas such as nitrogen or argon. It is particularly desirable, as shown in the Examples to be described later herein, to conduct the heat treatment at a temperature of at least 2,400° C., for the purpose of obtaining batteries having excellent cycle characteristics and storage characteristics. The heat treatment time varies according to the type of natural graphite but, generally, the usual impurities can be removed by heat treatment for about 24 hours.

It is desirable that the natural graphite to be heat treated have high crystallinity, with a d-value ($d_{002}$) in the lattice plane of (002) of not more than 3.37 Å and a crystal size in the c-axis direction (Lc) of at least 200 Å. Raw natural graphite of this type hardly changes its $d_{002}$ and Lc by heat treatment.

As described above, the key feature of the present invention lies in the use, to obtain a lithium secondary battery having excellent cycle characteristics and storage characteristics, of a natural graphite having little impurities as a negative electrode material. Accordingly, there are no particular restrictions with respect to other materials constituting the battery, such as positive electrode material and electrolyte solution and various materials that have been used or proposed can be used without limitation.

Thus, examples of usable positive electrode materials (active materials) are modified $MnO_2$, $LiCoO_2$, $LiNiO_2$, $LiMnO_2$, $LiMn_2O_4$ and $LiFeO_2$.

Examples of usable electrolyte solutions are those of electrolyte solutes such as $LiPF_6$, $LiBF_4$, $LiClO_4$ and $LiCF_3SO_3$ each dissolved in a organic solvent such as ethylene carbonate, vinylene carbonate or propylene carbonate, or in a mixed solvent of any one of the above organic solvents with a low-boiling-point solvent such as dimethyl carbonate, diethyl carbonate, 1,2-dimethoxyethane, 1,2-diethoxyethane or ethoxymethoxyethane.

Other features of the invention will become apparent in the course of the following descriptions of exemplary embodiments which are given for illustration of the invention and are not intended to be limiting thereof.

EXAMPLES

Examples 1 through 7

AA-size lithium secondary batteries according to the present invention were prepared as follows.

Positive Electrode

A slurry was prepared by dispersing a mixture obtained by mixing $LiCoO_2$ as a positive electrode active material and artificial graphite as a conductive agent in a ratio by weight of 9:1 in a 5% by weight solution of polyvinylidene fluoride in N-methylpyrrolidone (NMP). The slurry thus prepared was applied by doctor blade method to both sides of an aluminum foil as a positive electrode collector, and then vacuum-dried at 100° C. for 2 hours, to obtain a positive electrode.

Negative Electrodes

Natural graphite ($d_{002}$=3.360 Å, Lc=1,500 Å) was heat treated in a heating oven under an atmosphere of nitrogen (upper limit of heating temperature in the oven: 3,000° C.) at a temperature of 1,800, 2,000, 2,200, 2,400, 2,600, 2,800 or 3,000° C. for 24 hours. The $d_{002}$ and Lc were obtained after each heat treatment, all of which were the same as those before heat treatment.

Slurries were prepared by dispersing each of the above heat-treated graphite in a 5% by weight polyvinylidene fluoride as a binder in NMP. The slurries thus obtained were each applied by doctor blade method to both sides of a copper foil as a negative electrode collector, which were then vacuum-dried at 100° C. for 2 hours, to give 7 types of negative electrodes.

Electrolyte Solution $LiPF_6$ was dissolved in a 1/1 by volume mixed solvent of ethylene carbonate and dimethyl carbonate in a concentration of 1 mole/l, to prepare an electrolyte solution.

Preparation of Batteries

Seven types of AA-size batteries, BA1 through BA7 (larger numbers mean higher heat treating temperatures) of the present invention having different negative electrodes were prepared with the above positive electrode and electrolyte solution. A polypropylene microporous film (trade name: CELGARD, made by Celanese Corp.) was used as separator, which was impregnated with the above electrolyte solution.

FIG. 1 is a schematic cross-sectional view of the battery BA1 of the present invention (BA2 through BA7 have similar structure). In the FIGURE, the battery BA1 comprises a positive electrode 1, a negative electrode 2, a separator 3 separating the two electrodes, a positive electrode lead 4, a negative electrode lead 5, a positive electrode external terminal 6 and a negative electrode can 7. The positive and negative electrodes 1 and 2, between which a separator 3 is sandwiched, are spirally wound and housed in the negative electrode can 7. The positive electrode 1 is connected, via the positive electrode lead 4, to the positive electrode external terminal 6, and the negative electrode 2 to the negative electrode lead 7 via the negative electrode lead 5, so that chemical energy that generates inside the battery can be taken out as electric energy.

Comparative Examples 1 through 5

The procedure for Examples 1 through 7 was repeated except that natural graphite without heat treatment, or that heat treated at 1,000° C., 1,200° C., 1,400° C. or 1,600° C. was used, to prepare comparison batteries, in the above order, BC1 through BC5.

Relationship Between the Cycle Characteristics and the Heat Treating Temperature The batteries were each subjected to a cycle test to study the relationship between the cycle characteristic and the heat treating temperature for natural graphite. One cycle comprised charging with a charge current of 200 mA to a charge termination voltage of 4.1 V, followed by discharging with a discharge current of 200 mA to a discharge termination voltage of 2.75 V. The results are shown in FIG. 2.

Figure 2:
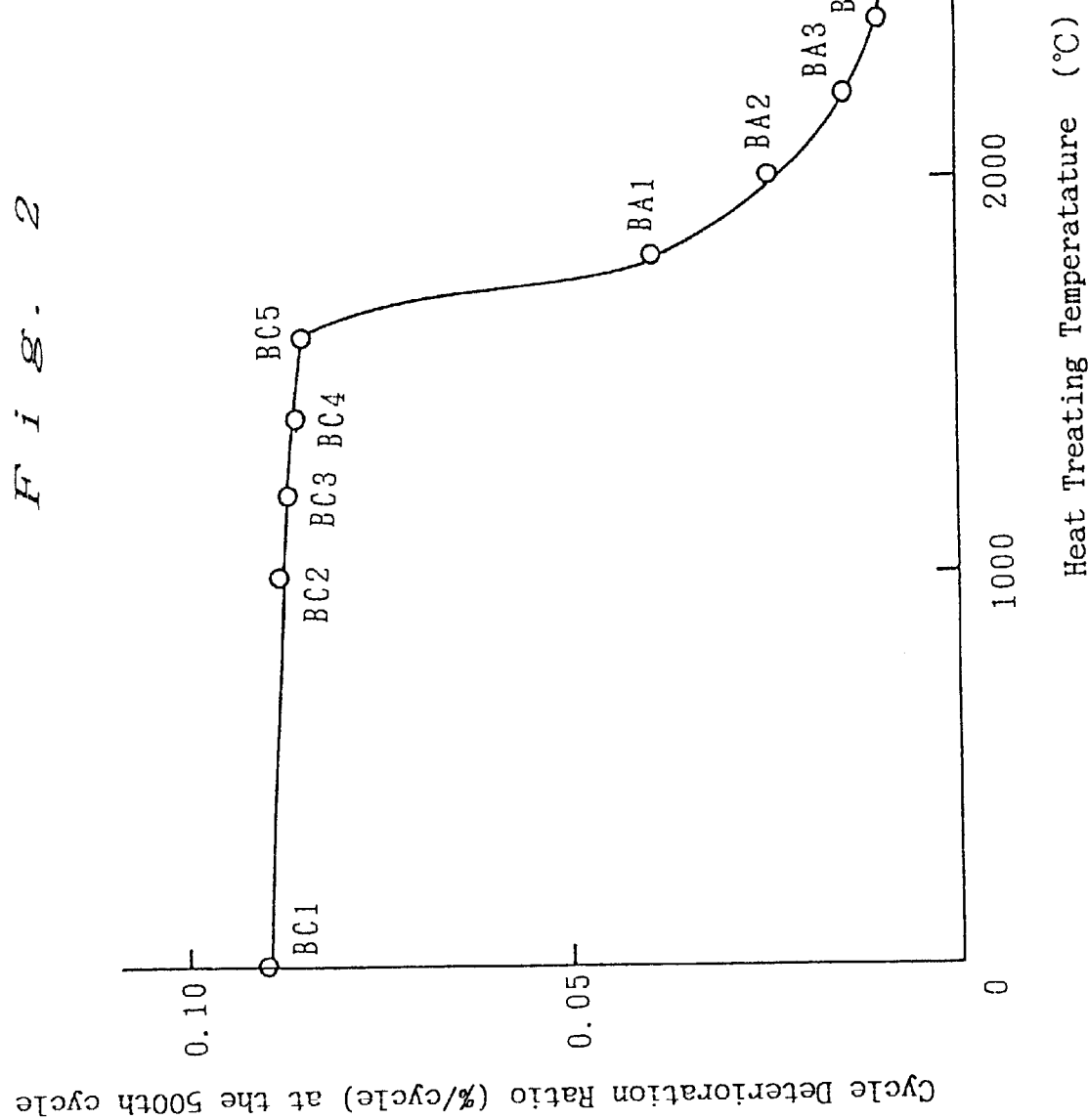
FIG. 2 is a graph showing the relationship between the cycle characteristics and the heat treatment temperature of natural graphite.

FIG. 2 is a graph showing the relationship between the cycle characteristics and the heat treating temperature of natural graphite, with the ordinate representing the cycle deterioration ratio (%/cycle) at the 500-th cycle and the abscissa representing the heat treating temperature (° C.). Zero (0) on the abscissa means no heat treatment. The cycle deterioration ratio is obtained by dividing the ratio (%) of the discharge capacity at the 500-th cycle to that at the initial stage of cycles by the total number of cycles repeated, i.e. 500.

It is understood from the FIGURE that the batteries of the present invention, BA1 through BA7, utilizing as their negative electrode natural graphite heat treated at a temperature of at least 1,800° C., have smaller cycle deterioration ratios, i.e. better cycle characteristics than those of comparison battery BC1 with a negative electrode utilizing natural graphite as it is, without heat treatment, and comparison batteries BC2 through BC5, utilizing natural graphite heat treated at a temperature of not more than 1,600° C. It is also understood from the FIGURE that, in particular, the batteries of the present invention BA4 through BA7, with the heat treating temperature exceeding 2,400° C. have markedly small cycle deterioration ratios, i.e. markedly excellent cycle characteristics.

Relationship Between the Storage Characteristics and the Heat Treating Temperature Each of the above batteries was, after being stored for 1 year, charged with a charge current of 200 mA to a charge termination voltage of 4.1 V and then discharged with a discharge current of 200 mA to a discharge termination voltage of 2.75 V, to study the relationship between the storage characteristics and the heat treating temperature for the natural graphite used for their negative electrode. The results are shown in FIG. 3.

Figure 3:
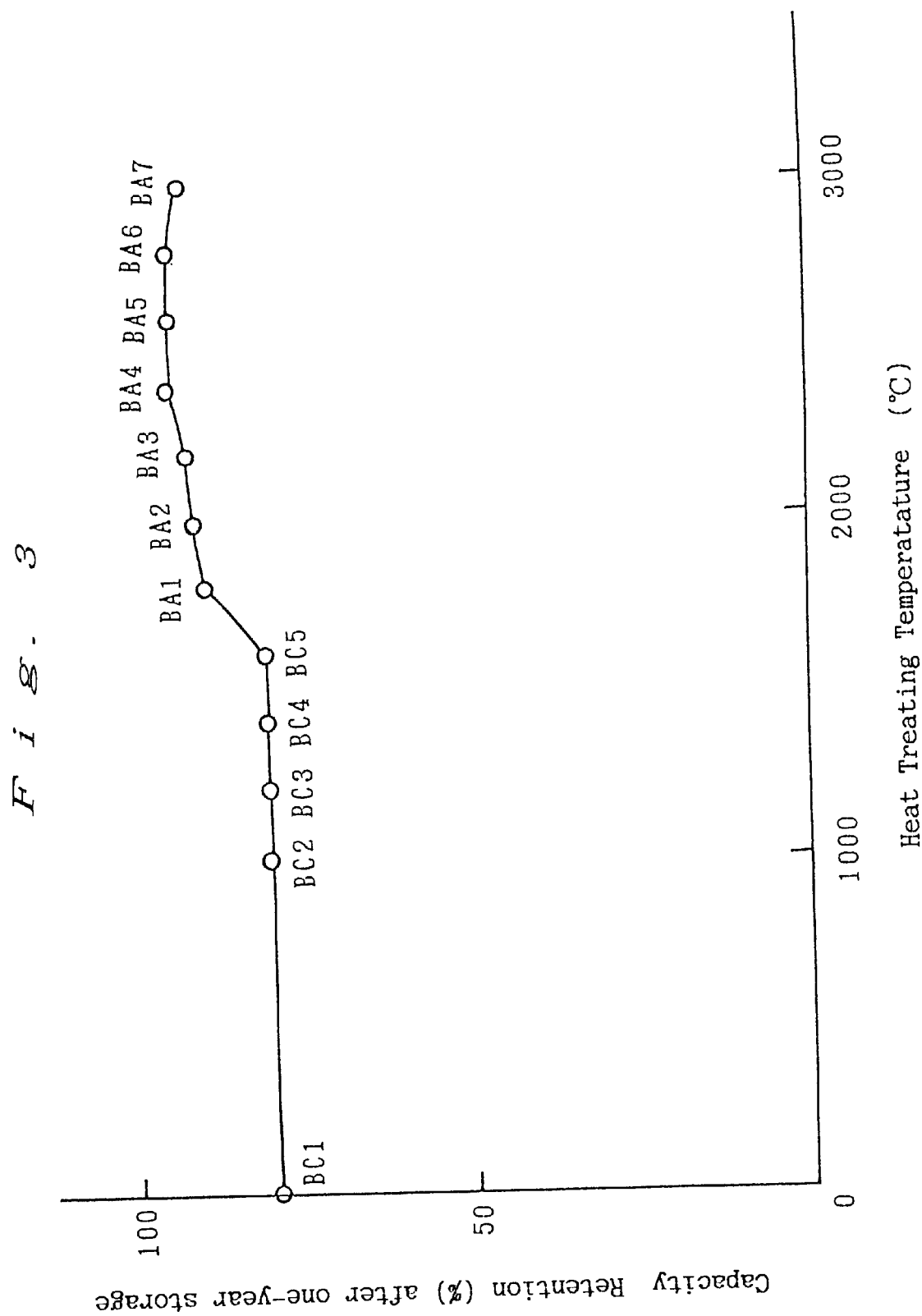
FIG. 3 is a graph showing the relationship between the storage characteristics and the heat treatment temperature of natural graphite.

FIG. 3 shows the relationship between the storage characteristic and the heat treating temperature of natural graphite, with the ordinate representing the capacity retention (%) after 1-year storage and the abscissa representing the heat treating temperature (° C.). Like in FIG. 2, zero (0) on the abscissa means no heat treatment. The capacity retention means the ratio (%) of the discharge capacity after 1-year storage to that before storage.

From the FIGURE it is understood that the batteries of the present invention BA1 through BA7, utilizing as their negative electrode natural graphite heat treated at a temperature exceeding 1,800° C., have larger capacity retentions, i.e. better storage characteristics compared with comparison batteries BC1 through BC5. It is also understood from the FIGURE that the batteries of the present invention BA4 through BA7, utilizing natural graphite heat treated at a temperature of, in particular, at least 2,400° C. have markedly excellent storage characteristics.

Although the present invention has been described hereinabove by reference to AA-size batteries alone, the invention can apply to batteries of any other shape, such as flat or square, with no particular limitation.

Obviously, numerous modifications and variations of the present invention are possible in light of the above teachings. It is therefore to be understood that within the scope of the appended claims, the invention may be practiced otherwise than as specifically described herein.

What is claimed is:

1. A process for preparing a lithium secondary battery, wherein the lithium secondary battery comprises a heat treated natural graphite as a negative electrode capable of occluding and discharging lithium ion, and wherein said process comprises a step of heating natural graphite to a temperature of 2,400° C. to 3000° C. to form said heat treated natural graphite.

2. The process according to claim 1, wherein said heat treated natural graphite has a d-value ($d_{002}$) in the lattice plane of (002) of not more than 3.37 Å and a crystallite size in the c-axis direction (Lc) of at least 200 Å.

3. A process for preparing a lithium secondary battery, wherein said lithium secondary battery comprises a carbon material as a negative electrode capable of occluding and discharging lithium ion, said carbon material consisting of a heat treated natural graphite, wherein said process comprises a step of heating natural graphite at a temperature of 2,400° C. to 3,000° C. whereby impurities are removed from said natural graphite thereby forming said heat treated natural graphite.

4. The process according to claim 3, wherein said natural graphite has a d-value ($d_{002}$) in the lattice plane of (002) of not more than 3.37 Å and a crystallite size in the c-axis direction (Lc) of at least 200 Å.

5. A process for preparing a lithium secondary battery, wherein the lithium secondary battery comprises:

a negative electrode comprised of a carbon material capable of occluding and discharging lithium ion, a positive electrode, and an electrolyte including an electrolyte solute selected from the group consisting of $LiPF_6$, $LiClO_4$, $LiBF_4$ and $LiCF_3SO_3$, and an organic solvent selected from a group consisting of ethylene carbonate, vinylene carbonate, propylene carbonate, dimethyl carbonate, diethyl carbonate, 1,2-dimethoxyethane, 1,2-diethoxyethane and ethoxymethoxyethane;

wherein said negative electrode consists essentially of a binder and said carbon material, wherein said carbon material is a heat treated natural graphite, and wherein said process comprises a step of heating natural graphite at a temperature of 2,400° C. to 3,000° C. to form the heat treated natural graphite.

6. The process according to claim 5, wherein said positive electrode includes a material selected from a group consisting of modified $MnO_2$, $LiCoO_2$, $LiNio_2$, $LiMnO_2$, $LiMn_2O_4$ and $LiFeO_2$.

7. The process according to claim 5, wherein said heat treated natural graphite has a d-value ($d_{002}$) in the lattice plane of (002) of not more than 3.37 Å and a crystallite size in the c-axis direction (Lc) of at least 200 Å.

8. The process according to claim 1, wherein said heating step is performed for at least 24 hours.

9. The process according to claim 3, wherein said heating step is performed for at least 24 hours.

10. The process according to claim 5, wherein said heating step is performed for at least 24 hours.

* * * * *